United States Patent [11] 3,545,324

[72] Inventor Joseph C. Rauscher
Houston, Texas (322 S. Main St., Pasadena, TX 77502)
[21] Appl. No. 592,887
[22] Filed Nov. 8, 1966
[45] Patented Dec. 8, 1970

[54] AUTOMATIC SHEARING DEVICE
4 Claims, 10 Drawing Figs.
[52] U.S. Cl.................................................. 83/363,
83/369, 83/592
[51] Int. Cl...................................................... B26d 5/24,
B26d 5/40
[50] Field of Search........................................... 83/355,
369, 208, 592, 596, 354, 157(Cursory), 363, 593,
639; 33/129, 132, 133, 134, 141(A)

[56] References Cited
UNITED STATES PATENTS

| | | | |
|---|---|---|---|
| 3,108,509 | 10/1963 | Felix...................... | 83/157X |
| 557,400 | 3/1896 | Knowlton.................. | 83/354 |
| 2,648,384 | 8/1953 | Hahn et al................. | 83/639X |
| 2,920,681 | 1/1960 | Humphner................. | 83/369X |

FOREIGN PATENTS

| | | | |
|---|---|---|---|
| 599,836 | 3/1948 | Great Britain............... | 83/369 |
| 980,951 | 1/1965 | Great Britain............... | 83/355 |

Primary Examiner—Andrew R. Juhasz
Assistant Examiner—Z. R. Bilinsky
Attorneys—Clarence A. O'Brien and Harvey B. Jacobson ABSTRACT: An automatic measuring and shearing device that allows fast moving continuous linear material to be cut into any length segments desired while maintaining the flow of the material.

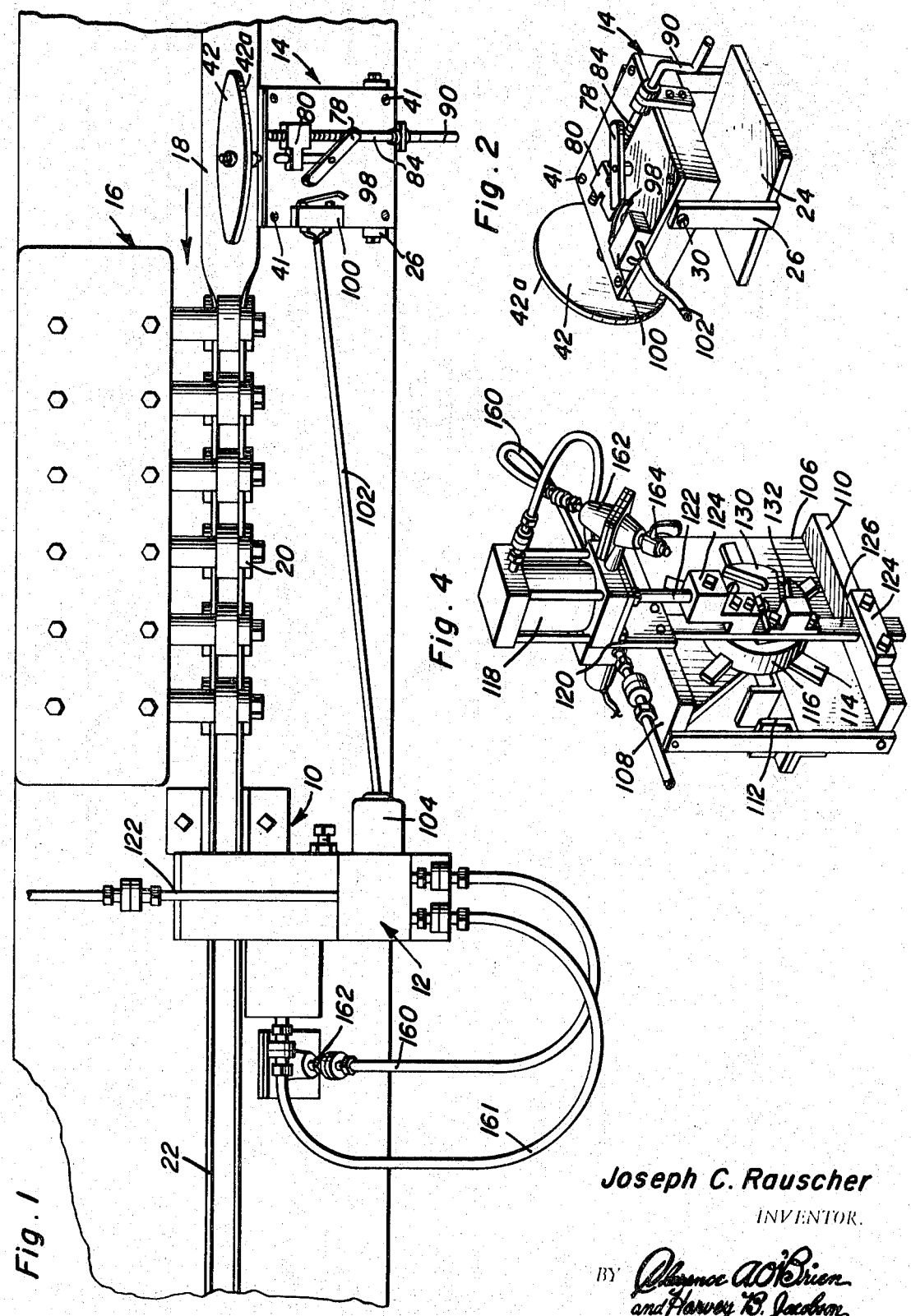

Joseph C. Rauscher
INVENTOR.

PATENTED DEC 8 1970
3,545,324
SHEET 3 OF 3
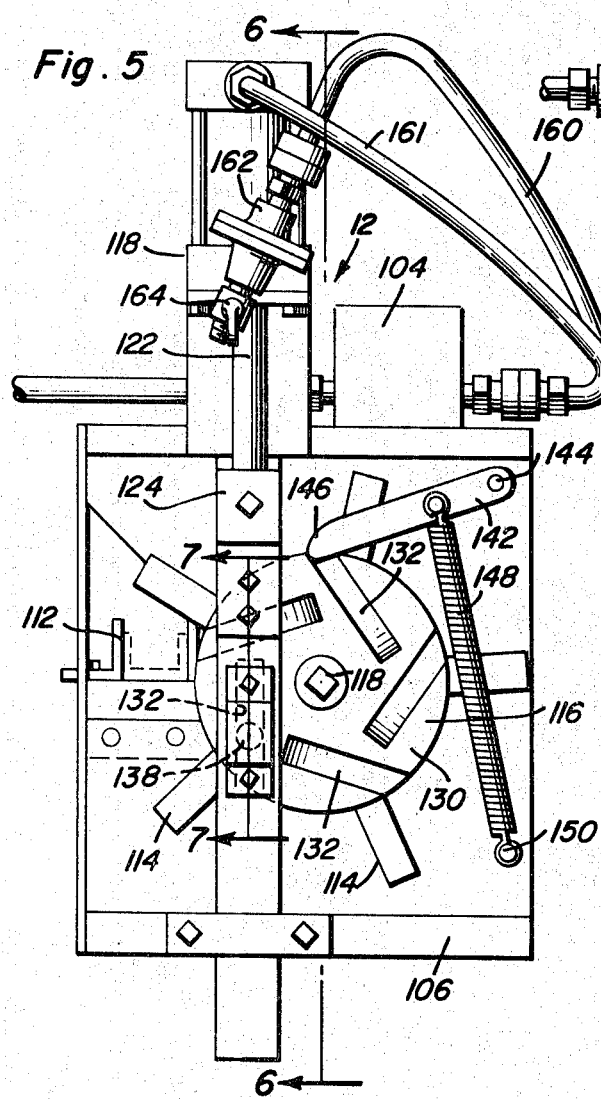
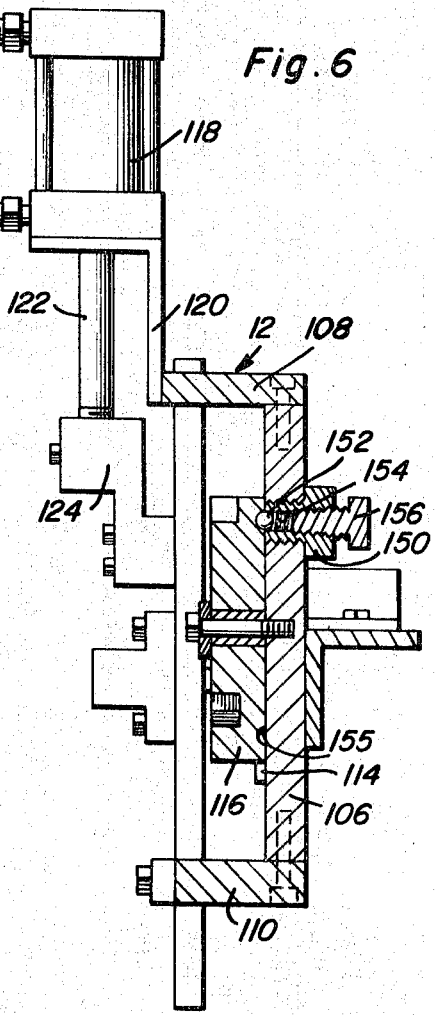
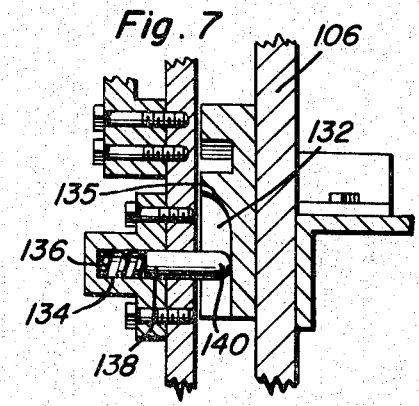
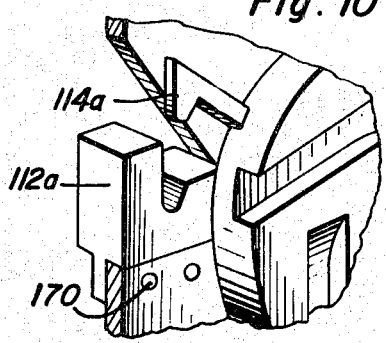
Joseph C. Rauscher
INVENTOR.
BY Clarence A. O'Brien
and Harvey B. Jacobson
Attorneys

AUTOMATIC SHEARING DEVICE

This invention generally appertains to improvements in machines or devices provided for shearing or cutting materials and more particularly relates to a novel automatic shearing device which is operable under high speed, precision conditions.

In the production of extruded plastic materials, the plastic material is extruded through an orifice in a die plate and it is necessary to provide a cutting or shearing means for shearing the plastic extrusions. The material is extruded at a constant flow and the shearing must be accomplished very rapidly so as not to interfere with such constant flow of the extruded material and yet, at the same time, the extruded material must be cut to exact sizes of various lengths, which must be accomplished without shutting down or stopping the extruder.

The same problem exists in roll form machines which form strips of metal or plastic stock into various shapes by passing the elongated stock lengthwise in strip form through forming means, such as forming rollers. The material is run in a continuous flow and must be cut to accurate lengths without interrupting the flow of material.

Therefore, in both the fields of extrusion of plastic materials, in rod, bar or any form, and the forming of stock material into desired configuration on roll form machines, the extruded material, whether plastic or any other material, and the formed material from a forming machine must be sheared or cut without interrupting the constant flow and with a known realization that the pieces are being cut to exact sizes.

Accordingly, an important object of the present invention is to provide a novel and simple automatic shearing device which is particularly adapted for use in functional and structural association with an extruder and a forming machine, wherein both have the severance problem of severing material that is flowing at a constant, high speed flow without interrupting the flow and severing the material to exact sizes.

A further important object of the present invention is to provide an automatic shearing device which depends upon its accuracy in the shearing of linear material into exact lengths by a mechanical metering means.

A further important object of the present invention is to provide an automatic shearing device which depends upon its accuracy in the shearing of linear material into exact lengths by virtue of its physical intimacy with the moving material, such intimacy occurring well in advance of the actual shearing station and being adjustable so as to vary the length of the sizes being cut but being extremely dependable so that each severed piece is of the same size.

In this regard, another main object of the present invention is to provide a metering means which is in physical contact with the constantly speedily moving material, whether from an extruder or a forming machine, and to mechanically count before directing the automatic operation of the shearing means disposed upstream therefrom, with respect to the movement of the material. The mechanical nature of the metering device or means which is in physical contact or intimacy with the fastly moving material accomplishes not only an exact precision, with respect to the cuts or severances made in the material but also permits of a speedy and accurate adjustment for varying the lengths of the cuts. Furthermore, it is not prone to malfunctioning, as if it were an electronic memory counter system or the like and, obviously, it is much more inexpensive, while being sturdier and more compact.

Another important object of the present invention is to provide a shearing means which receives its physically operating instruments from a counter that is in physical intimacy upstream, with respect to the flow of the material, with the material and which functions to sever the material very rapidly and speedily without interrupting the constant flow of the material. Consequently, it is a further aim of this invention to provide a shearing device which travels at a high rate of speed through the flowing material, past a shear bed knife and then halts so as not to interfere with the rate of flow of the material.

Another important object of the present invention is to provide a shearing means which has a plurality of shearing blades and which is rotated so as to bring each blade in successive fashion into a shearing operation and then to halt and await instructions from the metering device or counting device for bringing its next blade into shearing action with respect to the constantly flowing material and to provide means for insuring that each blade will be properly positioned, ready for the performance of its immediate speedy shearing action.

Another important object of the present invention is to provide a compact, sturdy and extremely inexpensive apparatus to purchase and maintain, while being an extremely efficient and effective, automatic shearing apparatus or device, which is particularly, though not restrictively, useful for cutting fastly linearly moving material, either from an extruder or a forming machine, into exact linear sizes.

These together with other objects and advantages which will become subsequently apparent reside in the details of construction and operation as more fully hereinafter described and claimed, reference being had to the accompanying drawings forming a pat part hereof, wherein like numerals refer to like parts throughout, and in which:

FIG. 1 is a top plan view of an automatic shearing device, constructed in accordance with the present invention and showing the same in operative association with a roll forming machine, such illustrated association being merely for exemplary purposes;

FIG. 2 is a perspective view, looking from the rear of the linear metering or counting means of the present invention;

FIG. 4 is a front perspective view of the shearing or severing means of the present invention;

FIG. 5 is a front elevational view of the severing or shearing means of FIG. 4 and showing the same on a larger scale;

FIG. 6 is a longitudinal, vertical sectional view, taken substantially on line 6–6 of FIG. 5;

FIG. 7 is a fragmentary vertical sectional view, taken substantially on line 7–7 of FIG. 5;

FIG. 10 is a fragmentary perspective view showing a modified form of shear bed and shear knives for form cutting.

Figure 3:
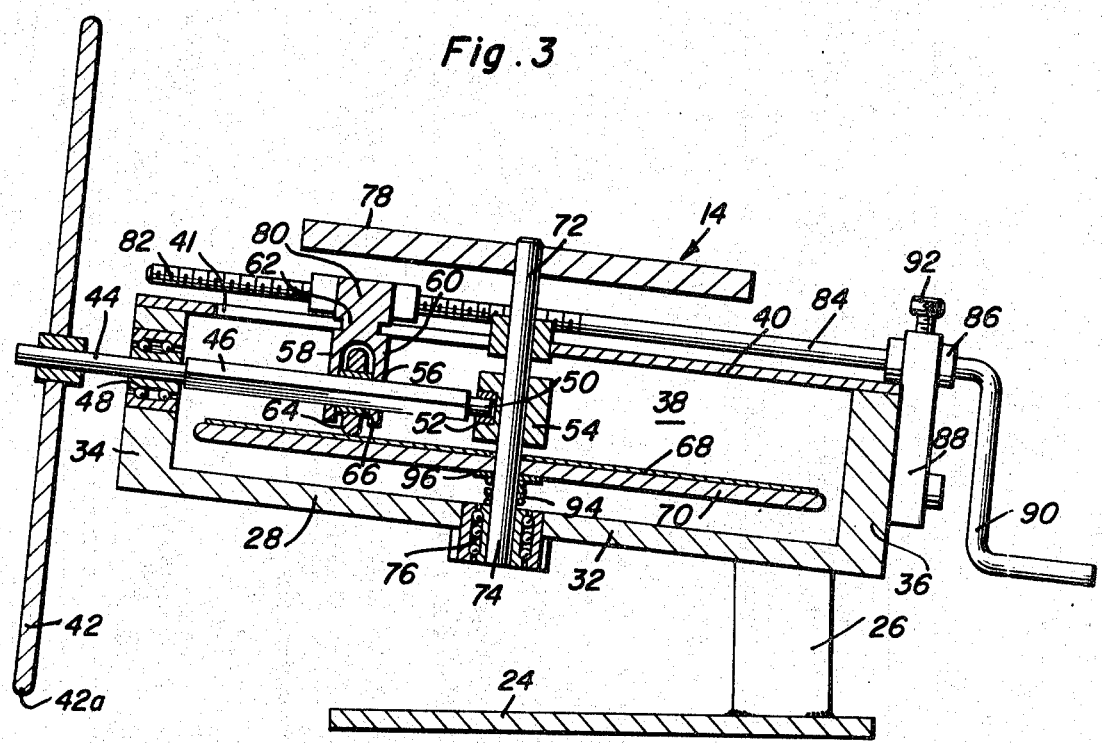
FIG. 3 is a detailed transverse, vertical sectional view of the metering or counting means of FIG. 2.

Referring now more particularly to the accompanying drawings, and initially to FIG. 1 for a general, rather comprehensive explanation of the present invention, the numeral 10 generally designates an automatic shearing device constructed in accordance with the present invention and which includes two necessary and functionally and structurally correlated means, namely, a shearing or cutting means 12 and a physical metering or counting means 14.

In FIG. 1, the automatic shearing device 10 is shown in operative association with a forming means 16, which is of the roll forming type and which functions to receive at one end a flat strip of stock 18 and through the forming rollers 20 transform the flat strip into a particular shape, as for example the channel-shaped strip 22. The metering or counting means 14 is in physical contact with the constantly, rapidly flowing stock strip 18 and, after a predetermined length of such stock has passed the metering or counting device 14, the latter is operative to actuate a switch means for rendering immediately operative the shearing or cutting means 12 so that each severed section of formed material 22 will be of the same length. The same would be equally true if the device 10 with the metering means 14 and the structurally and functionally associated shearing means 12 was associated with the extruding orifice of an extruder die plate for plastics or similar materials which move, just as the strip stock 18 moves, in a linear direction at a high rate of speed.

Attention is now directed to FIGS. 1 through 3 for a more detailed description of the metering or counting means 14, which is disposed upstream, with regard to the linearly moving material, from the shearing or cutting means 12. The metering or counting means 14 comprises a base or mounting plate 24 from which a pair of opposing rigid arms 26 upstand with a housing 28 being freely pivoted between the upper ends of the legs 26 by pivot pins 30, the housing being pivotally attached to the legs 26 adjacent its rearward end so that the forward end of the housing tends to swing under gravitational force downwardly for a purpose to be described. The housing 28 is formed with a bottom wall 32, a front wall 34 and a rear wall 36, along with opposing side walls 38. The side walls are pivoted directly to the upstanding legs adjacent the rear wall 36. The housing further includes a removable top wall 40, which is joined to the side and end walls by screw fasteners or the like 41.

A wheel 42 is rotatably mounted on the extending end portion 44 of a square or noncircular shaft 46. The annular projecting portion 44 of the square shaft 46 is rotatably mounted in a bearing assembly 48 formed in the front wall 34. The periphery 42a of the wheel is adapted to be in constant physical contact with the rapidly moving stock strip 18 and, in this respect, it can be appreciated that the entire weight of the housing will cause the periphery 42a of the wheel to bear under force of gravity and to be maintained in constant contact with the rapidly moving stock strip 18. The square shaft 46 has its opposite, coaxially reduced end portion 50 rotatably journaled by a bushing 52 in the socket of a cross member 54. The square shaft 46 passes unaffectedly through alined apertures 56 formed in the opposing legs 58 and 60 of a yoke member 62. A roller 64 is interposed between the legs 58 and 60 of the yoke and is attached to the square shaft 46 by a bushing 66. The roller 64 rides on the rubber or other friction forming surface material 68 on the disk 70.

The disk 70 is fixedly mounted on a shaft 72 which extends vertically in the housing and has its lower end portion 74 rotatably journaled in a bearing assembly 76 provided on the bottom wall 32. The shaft 72 extends through a suitable aperture in the top wall 40 and projects a considerable distance above the top wall 40 and is provided on its upper projecting end portion with a microswitch trip arm 78, the arm being fixed to the shaft 72 so that it is rotated by the shaft, which in turn is rotated by the drive wheel 64 which receives its rotation from the square shaft 46 that in turn is rotated by the wheel 40 through its engagement with the moving stock of material.

The yoke 62 has an upper portion 80 which is internally threaded and constitutes an adjusting screw travel nut threaded onto an elongated adjusting screw 82. The adjusting screw 82 extends rearwardly and has a plain rearward end portion 84 which is rotatably journaled in a collar 86 supported by an upstanding arm 88 on the exterior of the rear wall 36 of the housing. The rearward end portion 84 of the screw terminates in a hand crank end 90 and the screw can be locked in any preset position by a radial setscrew 92.

The disk 70 is maintained in perfect contact with the frictional roller 64 not only by virtue of the frictional contact between the periphery of the roller 64 and the friction facing or covering 68 on the upper surface of the disk 70 but also by virtue of a spring 94 which is coiled freely about the shaft 72 and bears at its lower end on the fixed bearing assembly 76 and bears at its upper end on the underside of the disk 70 through the intermediary of a washer 96.

As can be appreciated from a consideration of FIGS. 1 and 2, the trip arm 78 is adapted to trip and close the movable contact 98 of a microswitch 100 which is mounted on the top of the cover 40 of the housing and which is equipped with conductors 102 that lead to the shearing or cutting means 12, as will be described.

Thus, as can be appreciated from a consideration of FIGS. 1 and 3, the periphery 42a of the wheel 42 will be in constant physical engagement and contact with the moving stock strip 18, and will be rotated by virtue of such engagement. The overweight mounting of the housing will insure that the periphery 42a of the wheel 42 will be maintained constantly in firm engagement with the linearly moving stock strip 18 so that the wheel 42 will rotate in exact accordance with the linear rate of movement of the linearly moving stock 18. As the wheel 42 rotates, it will rotate the roller 64 through the bushing 66 with no effect whatsoever on the yoke 62 which serves merely as a support for the roller. The roller will rotate the wheel 70 and the trip arm 78 will respond to the rotational movements of the shaft 74, which is rotated by the disk 70, so that the trip arm 78 will engage and close the movable contact 98 of the microswitch.

The adjustment nut and screw arrangement is provided so as to move the roller 64 inwardly and outwardly relative to the circumferential edge of the disk 70. Obviously, the placement of the roller will determine the travel of the trip arm 78 so that an adjustment means is provided whereby an adjustment can be effected for adjusting to different speeds while the machine 16 is in operation.

The conductors 102, when the microswitch 100 is closed by the trip arm 78 will transmit an electric impulse to a solenoid valve 104 which is mounted on the shearing means 12 and controls the operation of an air cylinder, as will be described.

Figure 9:
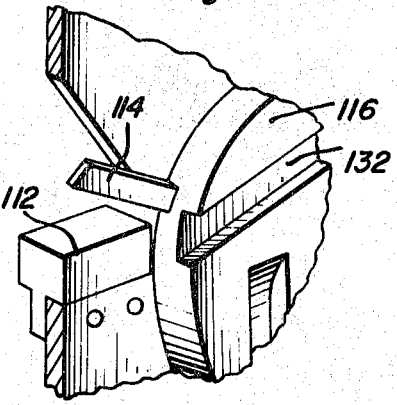
FIG. 9 is a fragmentary perspective view showing one form of shear bed and shear knife arrangement for straight cutting.

The shearing or cutting means 12 comprises a vertical frame 106, which has top and bottom supports 108 and 110. An interchangeable shear bed 112, as shown in FIGS. 4 and 9, is mounted on the plate or vertical frame 106 and supports the formed material and functions as a guideway for the material and as a shear bed in cooperation with a plurality of shear knives 114, which are mounted on the back face of an annular member 116. The member 116 is mounted for rotation by means of a bolt assembly 118 on the back of the vertical support plate 106.

An air cylinder 118 is mounted on a supporting bracket 120 that is secured to the top 108 of the supporting structure. The air cylinder 118 is fed by an air inlet lines 160 and 161 controlled by the solenoid valve 104. The member 116 constitutes a blade carrier and is provided on its upstream or forward face with the blades 114 which are mounted in suitably formed slots and held in place by fastening means so that the blades radiate from the periphery of the blade carrier and are adapted to cooperate with the shear bed 112 with the material moving through the shear bed. The air cylinder 118 is adapted to actuate a vertically reciprocal air ram 122, which has its lower end attached to a housing 124 which is attached to a vertical guide 126. The guide bar 126 is mounted for vertical reciprocation in slides formed in the top and bottom bars 110 and 108.

The back face 130 of the blade carrier is formed with radial grooves 132 and the ram housing 124 is provided with a bore 134 within which a spring 136 is seated and in which a pin 138 is socketed, the spring 136 urging the outer spherical end 140 of the pin outwardly into the grooves 132, which have inner curved ends 135, as shown in FIG. 7.

The ram 122 is reciprocated in the ways 124 and 128 so that it is in close tolerance with the back face of the blade carrier 116 which has its front face carrying the blades 114 in close tolerance with the back of the vertical support 106 in which the opening is formed for accommodating the shear bed 112. The ram housing 124 carries the pin 138 which is adapted to engage in the grooves 132 with its spherical end 140 riding in the grooves to the inner curved end 135 and, therefore, upon each forceful downward movement of the ram 126 under the air cylinder 118 and its rod 122, which is connected to the carrier housing 124, the blade carrier 116 is rotated so as to bring one of the shear blades 114 past the opening in which the material moves through the support 106 and past the cooperating shear bed 112. The pin 138 constitutes a drive pin that drives against the inner side of the grooves and causes the blade carrier to rotate. The grooves extend all the way out to the outer edge of the blade carrier, as can be appreciated from FIG. 4. The stroke of the arm is such that at the bottom of the downstroke the drive pin stops well below the centerline of the blade carrier. This prevents the momentum developed on the downstroke from carrying the blade carrier around too far as the forward motion of the blade carrier ceases when the outerside of the drive groove comes against the drive pin. The length of the stroke of the ram, both downward and upward, is governed by the length of the stroke of the air cylinder piston rod 122.

Figure 8:
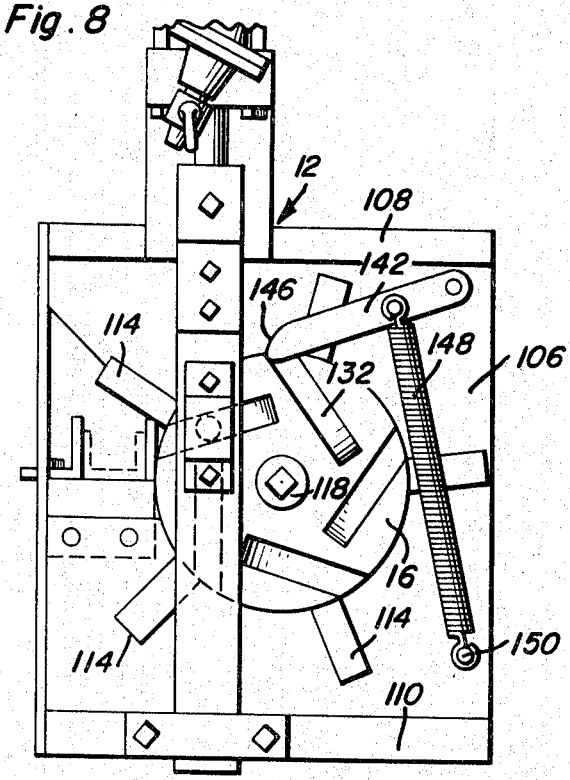
FIG. 8 is a detailed front elevational view of the shearing means.

Means is provided for preventing backward rotation of the blade carrier during the upward stroke of the ram and such is shown in detail in FIG. 5. The means includes a pivoted dog 142, which has one end secured by a pivot pin 144 and a free slightly curved end 146. The dog is urged downwardly by a retraction spring 148 which is attached thereto and secured to a pin 150 on the back wall of the support structure or plate 106. The back face of the blade carrier is formed with the drive grooves and the outer free end 146 of the pivoted dog is adapted to engage in the drive grooves and prevent the backward rotation of the blade carrier during the upstroke of the ram. Thus, as one of the blades is swung across the opening and through th material on the shear bed 112 under the action of the air ram, which is produced by the air cylinder construction, the then free end 146 of the pivoted dog rides on the periphery of the rotorlike, annular blade carrier and, upon the upstroke of the ram, the dog engages in the outer end of the adjoining drive groove, as shown in FIGS. 5 and 8, to prevent any backward rotation of the blade carrier during the upward stroke of the ram.

As shown in FIG. 6, a detent 152 is provided and is adapted to be urged by a spring 154 into engagement with one of a selected number of semicircular openings 155 formed in the front face of the blade carrier 116. The detent 152 is kept under compression by the spring 154 with the compression being adjustable by virtue of the adjustment screw 156, which is threaded into a threaded socket 158 that is in turn threaded into an opening in the supporting wall 106. The function of the spring-urged ball detent 152 is to engage in the semispherical depressions or indentations in the back side of the blade carrier to insure that it comes to rest in the proper position to start the next downstroke. The ball detent also absorbs any tendency of the blade carrier to rebound off the pivot dog 142.

The blades 114 are mounted in the grooves provided in the side of the blade carrier facing the supporting wall structure 106 and are held in place by a flat head screw.

Air is admitted to the air cylinder 118 through the inlet air line 161 and the admission thereof is controlled by the solenoid 104. The air is exhausted from the bottom of the air cylinder 118 through a flexible line 160, which is attached to the bottom of the air cylinder and constitutes a quick exhaust valve and is connected to a quick exhaust valve 162, the outlet of which is controlled by a hand cock 164. The hand cock valve 164 is provided merely to regulate the volume of the air escaping from the quick exhaust valve 162. The purpose of the quick exhaust valve is to permit the air remaining in the bottom of the air cylinder from the upstroke to be quickly exhausted into the atmosphere instead of going through the solenoid which has a small exhaust port. If such air is not exhausted quickly, it forms a back pressure in the air cylinder, thus decreasing the power of the downstroke. The quick exhaust valve closes on the upstroke permitting the air cylinder to be driven upward by the air coming from the inlet line under the control of the solenoid valve into the bottom of the air cylinder.

In FIG. 9, the blade carrier 116 is shown in detail with one of the blades 114 and the shear bed 112 is shown which is provided for straight cutting. In FIG. 10, a shear bed 112a is shown, it being noted that the shear beds are interchangeable and are attached to the supporting plate 106 by fasteners 170. The shear bed 112a is adapted to cooperate with a hook-line shear knife 114a that is positioned in place of the straight knives 114, such arrangement being provided for form cutting.

It can thus be seen that the amount of linear footage of the stock 22 to be cut by the shearing means 12 can be adjusted by the adjustment of the roller 64, which is easily effected through the handcrank 90 and the feed screw 82 which lies above the top wall 40, such wall having a slit 41 for accommodating the movements of the yoke 62. The yoke, carrying the roller 64, can be positioned at any desired point along the length of the square shaft 46 depending upon the length of the pieces to be cut. Such adjustment can be carried out without stopping or interrupting the operation of the forming machine 16 or an extrusion machine or the like with which the shearing device 10 may be structurally and functionally associated. Once the desired length of the sections to be cut is determined and the yoke is set accordingly, the periphery 42a of the wheel 42 engages the strip stock 18 and causes the shaft 72 to rotate and carry the trip arm 78 into engagement with the movable contact 98 of the microswitch 110. Whereupon, an electrical impulse is sent through the conductors 102 to the solenoid 104 which causes the air cylinder to operate and drive the air ram downwardly, such downward engagement causing the driving pin 138 to drive against the side of the drive slot 132 in the back face of the blade carrier and cause a partial rotation of the blade carrier, such partial rotation being sufficient and forceful enough to cause the blade, lying immediately above the shear bed, as shown in FIG. 4, to pass through and sever the material. The pivoted dog 142 prevents any backward rotation of the blade carrier during the upstroke of the ram. The spring-urged ball detent 152 engages in the depressions in the back side of the blade carrier, each depression lying behind one of the blades, to ensure that the blade carrier comes to rest in the proper position to start the next downstroke. Such spring-urged ball detent 152 also absorbs any tendency of the blade carrier to rebound off the pivoted dog 142.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. An automatic shearing device for moving linear material, comprising: shearing means to sever the material in response to a signal, and metering means driven by the material to generate a signal to actuate said shearing means, said shearing means including a support plate, a shear bed on said plate for receiving the material, a carrier disk journaled for rotation on said plate with the periphery thereof adjacent said shear bed, a series of cutting blades fixed to said carrier disk in radially extending relationship thereto, and means to intermittently rotate said carrier disk in response to said signal from the metering means to move the cutting blades past the shear bed, said means to rotate said carrier disk including a ram having a spring-urged driving pin and said carrier disk having a planar face thereon provided with grooves for receiving the pin.

2. The device of claim 1 wherein a pivoted dog is carried by the support plate and is adapted to engage the grooves for preventing backward rotation of the carrier disk.

3. The device of claim 1 wherein said metering means includes a drive wheel having a periphery in engagement with the moving material and drivingly rotated thereby, a driven circular disk, variable drive means operatively connected between said drive wheel and said driven circular and actuating means connected to said driven disk to generate a signal to actuate the ram, said drive wheel and driven disk being fixed on shafts journaled for rotation perpendicular to one another with the shaft of the drive wheel extending radially inwardly of said driven disk in parallel spaced relation thereto, said variable drive means including a wheel in driving engagement with said disk and mounted on said drive wheel shaft for rotation therewith and movement therealong to drive said disk at variable relative speeds in relation to the rotational speed of the drive wheel, said actuating means including a trip arm fixed to the disk shaft for rotation therewith to actuate a microswitch and produce a signal for actuating said ram.

4. The device of claim 1 wherein each of said grooves includes an inclined inner end surface for camming the pin out of the groove when the pin moves inwardly in the groove, said grooves in the plate being angularly related to each other, said grooves being related to said blades to locate a groove receiving the driving pin with the ram retracted in angular relation to the path of movement of the pin with the blade adjacent the shear bed whereby extension of the ram will rapidly accelerate said blade across the shear bed and aline the groove with the path of movement of the pin when the ram is fully extended thereby stopping rotation of the carrier disk, retraction of the ram camming the pin out of the inner end of the groove and moving it along the planar surface and into an adjacent groove, and a pivoted dog engaging said carrier disk to prevent reverse rotation thereof when the ram is being retracted.